US008099277B2

(12) United States Patent
Yamamoto et al.

(10) Patent No.: US 8,099,277 B2
(45) Date of Patent: Jan. 17, 2012

(54) SPEECH-DURATION DETECTOR AND COMPUTER PROGRAM PRODUCT THEREFOR

(75) Inventors: Koichi Yamamoto, Kanagawa (JP); Akinori Kawamura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1033 days.

(21) Appl. No.: 11/725,566

(22) Filed: Mar. 20, 2007

(65) Prior Publication Data

US 2008/0077400 A1 Mar. 27, 2008

(30) Foreign Application Priority Data

Sep. 27, 2006 (JP) ................................ 2006-263113

(51) Int. Cl.
*G10L 15/00* (2006.01)
*G10L 21/00* (2006.01)
*G10L 19/00* (2006.01)

(52) U.S. Cl. ............. 704/248; 704/9; 704/231; 704/253

(58) Field of Classification Search .................. 704/248, 704/253
See application file for complete search history.

(56) References Cited

U.S. PATENT DOCUMENTS 4,239,936 A * 12/1980 Sakoe ........................... 704/233
4,531,228 A * 7/1985 Noso et al. .................... 704/275
4,829,578 A * 5/1989 Roberts ......................... 704/233
5,201,028 A * 4/1993 Theis ............................ 704/200
5,293,588 A 3/1994 Satoh et al.
5,611,019 A 3/1997 Nakatoh et al.
5,649,055 A * 7/1997 Gupta et al. .................. 704/233
5,754,681 A 5/1998 Watanabe et al.
5,991,721 A 11/1999 Asano et al.
6,161,087 A * 12/2000 Wightman et al. ........... 704/215
6,263,309 B1 7/2001 Nguyen et al.
6,317,710 B1 * 11/2001 Huang et al. .................. 704/246
6,327,565 B1 12/2001 Kuhn et al.
6,343,267 B1 1/2002 Kuhn et al.
6,529,872 B1 3/2003 Cerisara et al.
6,600,874 B1 * 7/2003 Fujita et al. ..................... 386/96
6,691,091 B1 2/2004 Cerisara et al.
(Continued)

FOREIGN PATENT DOCUMENTS

JP 61-156100 7/1986
(Continued)

OTHER PUBLICATIONS

Office Action in Japanese Application No. 2006-263113 dated Nov. 11, 2008 and partial English-language translation thereof.

(Continued)

*Primary Examiner* — Justin Rider
(74) *Attorney, Agent, or Firm* — Nixon & Vanderhye, P.C.

(57) ABSTRACT

A speech-duration detector includes a starting-end detecting unit that detects a starting end of a first duration where the characteristic exceeds a threshold value as a starting end of a speech-duration, when the first duration continues for a first time length; a trailing-end-candidate detecting unit that detects a starting end of a second duration where the characteristic is lower than the threshold value as a candidate point for a trailing end of speech, when the second duration continues for a second time length; and a trailing-end-candidate determining unit that determines the candidate point as a trailing end of the speech-duration, when the second duration where the characteristic exceeds the threshold value does not continue for the first time length while a third time length elapses from measurement at the candidate point.

15 Claims, 7 Drawing Sheets

U.S. PATENT DOCUMENTS

| | | | | |
|---|---|---|---|---|
| 6,757,652 | B1 * | 6/2004 | Lund et al. | 704/254 |
| 7,089,182 | B2 | 8/2006 | Souilmi et al. | |
| 7,236,929 | B2 * | 6/2007 | Hodges | 704/233 |
| 7,634,401 | B2 * | 12/2009 | Fukada | 704/215 |
| 2002/0138254 | A1 * | 9/2002 | Isaka et al. | 704/208 |
| 2004/0064314 | A1 | 4/2004 | Aubert et al. | |
| 2004/0102965 | A1 * | 5/2004 | Rapoport | 704/207 |
| 2004/0215458 | A1 | 10/2004 | Kobayashi et al. | |
| 2005/0201595 | A1 | 9/2005 | Kamei | |
| 2006/0053003 | A1 | 3/2006 | Suzuki et al. | |
| 2006/0206330 | A1 * | 9/2006 | Attwater et al. | 704/252 |
| 2006/0287859 | A1 * | 12/2006 | Hetherington et al. | 704/260 |
| 2007/0088548 | A1 | 4/2007 | Yamamoto et al. | |
| 2008/0304750 | A1 | 12/2008 | Kamei | |

FOREIGN PATENT DOCUMENTS

| | | |
|---|---|---|
| JP | 62-211699 | 9/1987 |
| JP | 62-237498 | 10/1987 |
| JP | 04-016999 | 1/1992 |
| JP | 04-058297 | 2/1992 |
| JP | 08-106295 | 4/1996 |
| JP | 9-245125 | 9/1997 |
| JP | 10-254476 | 9/1998 |
| JP | 11-52977 | 2/1999 |
| JP | 2000-081893 | 3/2000 |
| JP | 3105465 | 9/2000 |
| JP | 2003-303000 | 10/2003 |
| JP | 2004-192603 | 7/2004 |
| JP | 2004-272201 | 9/2004 |
| JP | 2004-325979 | 11/2004 |
| JP | 2005-31632 | 2/2005 |
| JP | 2007-233148 | 9/2007 |

OTHER PUBLICATIONS

N. Binder et al., "Speech Non-Speech Separation With GMMS", Proc. Acoustic Society of Japan Fall Meeting, vol. 1, pp. 141-142 (2001).

K. Ishii et al, "Easy-to-Understand Pattern Recognition", NTT Communication Science Laboratories, Ohmsha, Ltd. (1998).

Yusuke Kida et al.; "Voice Activity Detection based on Optimally Weighted Combination of Multiple Features"; Information Processing Society of Japan; NII—Electronic Library Service; Jul. 15, 2005; pp. 49-54.

Ponceleon et al., Automatic Discovery of Salient Segments in Imperfect Speech Transcripts, Oct. 2001, ACM, 1-58113-436-3/01/0011.

Yamamoto et al., U.S. Appl. No. 11/582,547, filed Oct. 18, 2006.

* cited by examiner

SPEECH-DURATION DETECTOR AND COMPUTER PROGRAM PRODUCT THEREFOR

CROSS-REFERENCE TO RELATED APPLICATIONS

This application is based upon and claims the benefit of priority from the prior Japanese Patent Application No. 2006-263113, filed on Sep. 27, 2006; the entire contents of which are incorporated herein by reference.

BACKGROUND OF THE INVENTION

1. Field of the Invention

The present invention relates to a speech-duration detector that detects a starting end and a trailing end of speech from an input acoustic signal, and to a computer program product for the detection.

2. Description of the Related Art

A typical speech-duration detection method (a speech-duration detector) detects starting and trailing ends of a speech-duration based on rising/falling of an envelope of a short-time power (hereinafter, "power") extracted for each frame of 20 to 40 milliseconds. Such detection of starting and trailing ends of a speech-duration is carried out by using a finite state automaton (FSA) disclosed in Japanese Patent No. 3105465.

However, according to the finite state automaton disclosed in Japanese Patent No. 3105465, a single time control parameter is used to detect each of starting and trailing ends. When noise extemporaneously occurs after an appropriate trailing end (a correct trailing end) of a speech-duration, a trailing end to be detected is disadvantageously detected in regard of the correct trailing end due to an influence of a power of the extemporaneous noise.

It is to be noted that a countermeasure of reducing a trailing end detection time to be shorter than a time length from the correct trailing end to the extemporaneous noise can be considered for the problem. When the trailing end detection time is simply reduced, however, a word including a double consonant, e.g., "Sapporo" is detected as divided durations. That is, there is a problem that silence in a word cannot be discriminated from that after end of utterance.

SUMMARY OF THE INVENTION

According to one aspect of the present invention, a speech-duration detector includes a characteristic extracting unit that extracts a characteristic of an input acoustic signal; a starting-end detecting unit that detects a starting end of a first duration where the characteristic exceeds a threshold value as a starting end of a speech-duration, when the first duration continues for a first time length; a trailing-end-candidate detecting unit that detects a starting end of a second duration where the characteristic is lower than the threshold value as a candidate point for a trailing end of speech, when the second duration continues for a second time length after the starting end of the speech-duration is detected; and a trailing-end-candidate determining unit that determines the candidate point as a trailing end of the speech-duration, when the second duration where the characteristic exceeds the threshold value does not continue for the first time length while a third time length elapses from measurement at the candidate point.

According to another aspect of the present invention, a speech-duration detector includes a characteristic extracting unit that extracts a characteristic of an input acoustic signal; a starting-end-candidate detecting unit that detects a starting end of a third duration where the characteristic exceeds a threshold value as a candidate point for a starting point of speech, when the third duration continues for a fourth time length; a starting-end-candidate determining unit that determines the candidate point as a starting end of a speech-duration, when measurement starts from the candidate point and a forth duration where the characteristic exceeds a threshold value continues for a fifth time length; and a trailing-end detecting unit that detects a starting end of a fifth duration where the characteristic is lower than the threshold value as a trailing end of the speech-duration, when the fifth duration continues for a sixth time length after the starting end of the speech-duration is determined.

A computer program product according to still another aspect of the present invention causes a computer to perform the method according to the present invention.

DETAILED DESCRIPTION OF THE INVENTION

Figure 1:
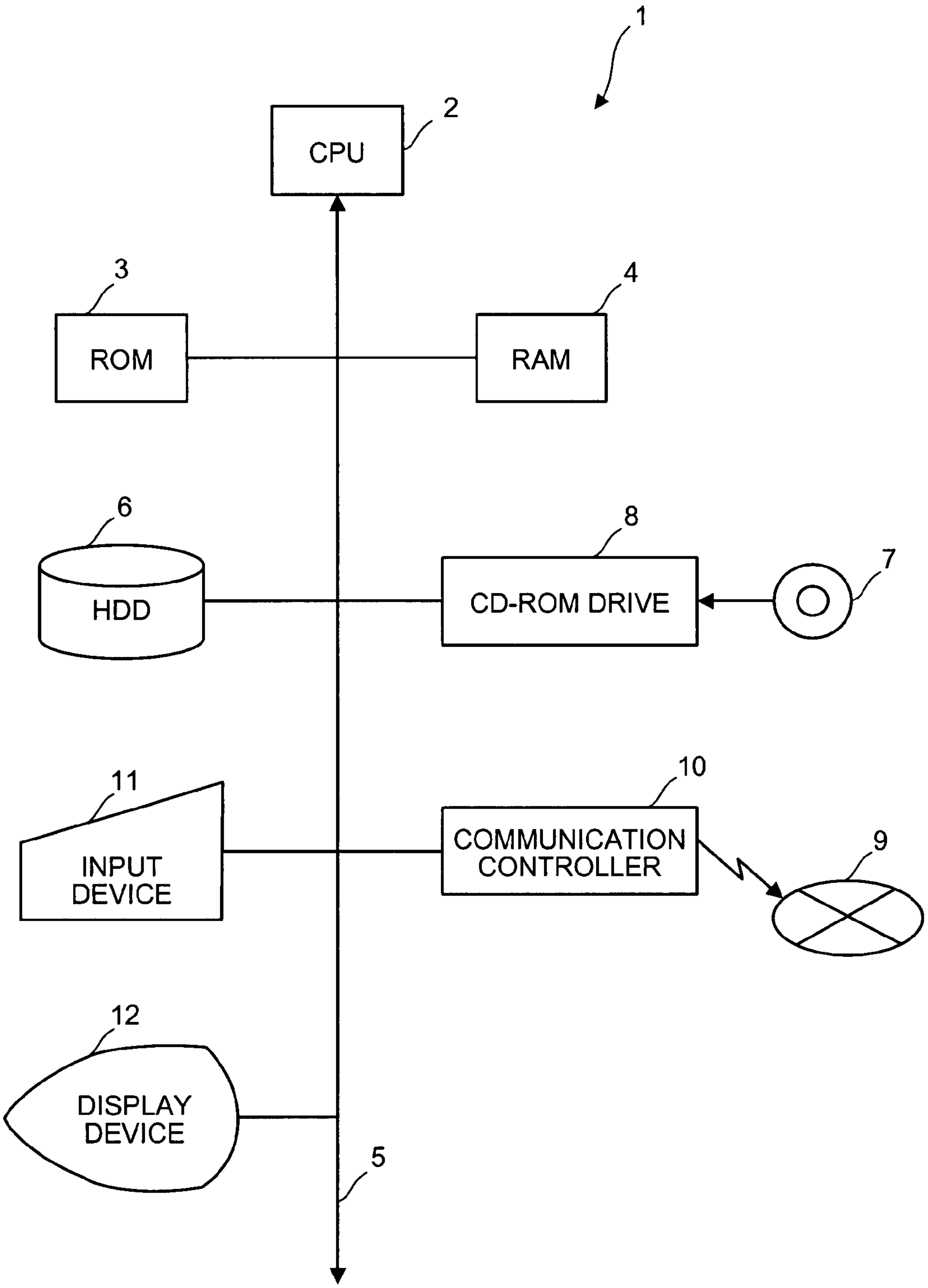
FIG. 1 is a block diagram showing a hardware configuration of a speech-duration detector according to a first embodiment of the present invention.

A first embodiment according to the present invention will now be explained with reference to FIGS. 1 to 4. FIG. 1 is a block diagram of a hardware configuration of a speech-duration detector according to the first embodiment. The speech-duration detector according to the embodiment generally uses a finite state automaton (FSA) to detect a starting and a trailing ends of a speech-duration.

As shown in FIG. 1, the speech-duration detector 1 is, e.g., a personal computer, and includes a Central Processing Unit (CPU) 2 that is a primary unit of the computer and intensively controls each unit. To the CPU 2 are connected a Read Only Memory (ROM) 3 as a read only memory storing, e.g., BIOS therein and a Random Access Memory (RAM) 4 that rewritably stores various kinds of data through a bus 5.

To the bus 5 are connected a Hard Disk Drive (HDD) 6 that stores various kinds of programs, a CD-ROM drive 8 that reads information in a Compact Disc (CD)-ROM 7 as a mechanism that reads computer software as a distributed program, a communication controller 10 that controls communication between the speech-duration detector 1 and a network 9, an input device 11, e.g., a keyboard or a mouse that instructs various kinds of operations, a display unit 12 that displays various kinds of information, e.g., a Cathode Ray Tube (CRT) or a Liquid Crystal Display (LCD) via an I/O (not shown).

Since the RAM 4 has properties of rewritably storing various kinds of data, it functions as a working area for the CPU 2 to serve as, e.g., a buffer.

The CD-ROM 7 shown in FIG. 1 realizes a storage medium in the present invention, and stores an Operating System (OS) or various kinds of programs. The CPU 2 reads a program stored in the CD-ROM 7 by using the CD-ROM drive 8, and installs it in the HDD 6.

It is to be noted that, as a storage medium, various kinds of optical disks such as a DVD, various kinds of magneto optical disks, various kinds of magnetic disks such as a flexible disk, and medias adopting various kinds of modes such as a semiconductor memory can be used as well as the CD-ROM 7. A program may be downloaded from the network 9, e.g., the Internet via the communication controller 10 to be installed in the HDD 6. In this case, a storage unit that stores the program in a server on a transmission side is also a storage medium in the present invention. It is to be noted that the program may operate in a predetermined Operating System (OS). In this case, the program may allow the OS to execute a part of after-mentioned various kinds of processing. Alternatively, the program may be included as a part of a program file group constituting a predetermined application software or the OS.

The CPU 2 that controls operations of the entire system executes various kinds of processing based on the program loaded in the HDD 6 used as a main storage unit in the system.

Of functions executed by the CPU 2 based on various kinds of programs installed in the HDD 6 of the speech-duration detector 1, characteristic functions of the speech-duration detector 1 according to the embodiment will now be explained.

Figure 2:
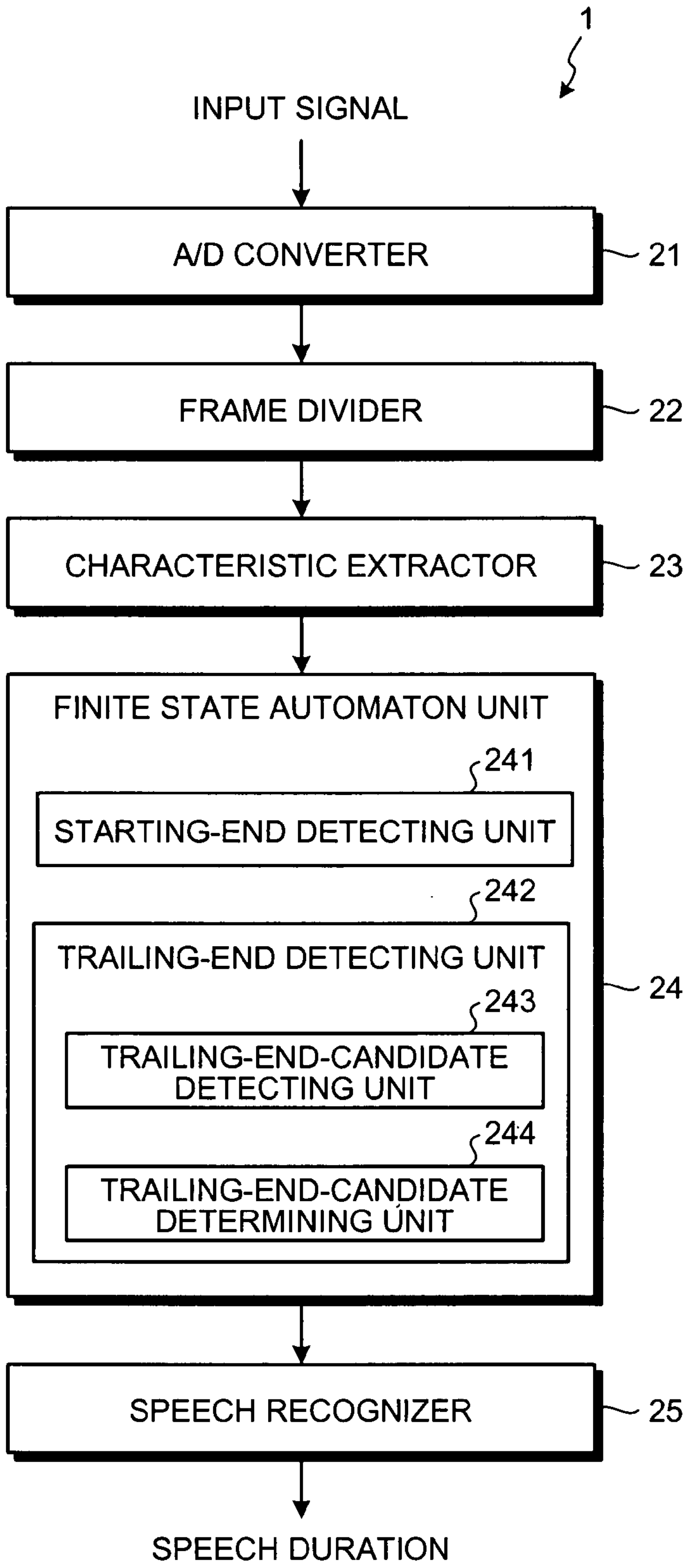
FIG. 2 is a block diagram showing a functional configuration of the speech-duration detector.

FIG. 2 is a block diagram of a functional configuration of the speech-duration detector 1. As shown in FIG. 2, the speech-duration detector 1 includes an A/D converter 21 that converts an input signal from an analog signal to a digital signal at a predetermined sampling frequency in compliance with a speech-duration detection program, a frame divider 22 that divides a digital signal output from the A/D converter 21 into frames, a characteristic extractor 23 as a characteristic extracting unit that calculates a power from frames divided by the frame divider 22, a finite state automaton (FSA) unit 24 that uses a power obtained by the characteristic extractor 23 to detect starting and trailing ends of speech, and a voice recognizer 25 that uses duration information from the FSA unit 24 to perform speech recognition processing.

The FSA unit 24 includes a starting-end detecting unit 241 that detects a starting end of a duration where a characteristic extracted by the characteristic extractor 23 exceeds a threshold value as a starting end of a speech-duration when the duration continues for a predetermined time, and a trailing-end detecting unit 242 that detects a starting end of a duration where a characteristic extracted by the characteristic extractor 23 is below a threshold value as a trailing end of a speech-duration when the duration continues for a predetermined time after the starting-end detecting unit 241 detects the starting end of the speech-duration. The trailing-end detecting unit 242 includes a trailing-end-candidate detecting unit 243 that detects a candidate point for a speech trailing end, and a trailing-end-candidate determining unit 244 that determines a trailing-end candidate point detected by the trailing-end-candidate detecting unit 243 as a speech trailing end.

A procedure of the processing will now be explained hereinafter. First, the A/D converter 21 converts an input signal required to detect a speech-duration into a digital signal from an analog signal. Then, the frame divider 22 divides the digital signal converted by the A/D converter 21 into frames each having a length of 20 to 30 milliseconds and an interval of approximately 10 to 20 milliseconds. At this time, a hamming window may be used as a windowing function required to perform framing processing. Then, the characteristic extractor 23 extracts a power from an acoustic signal of each frame divided by the frame divider 22. Thereafter, the FSA unit 24 uses the power of each frame extracted by the characteristic extractor 23 to detect starting and trailing ends of speech, and carries out speech recognition processing with respect to a detected duration.

Figure 3:
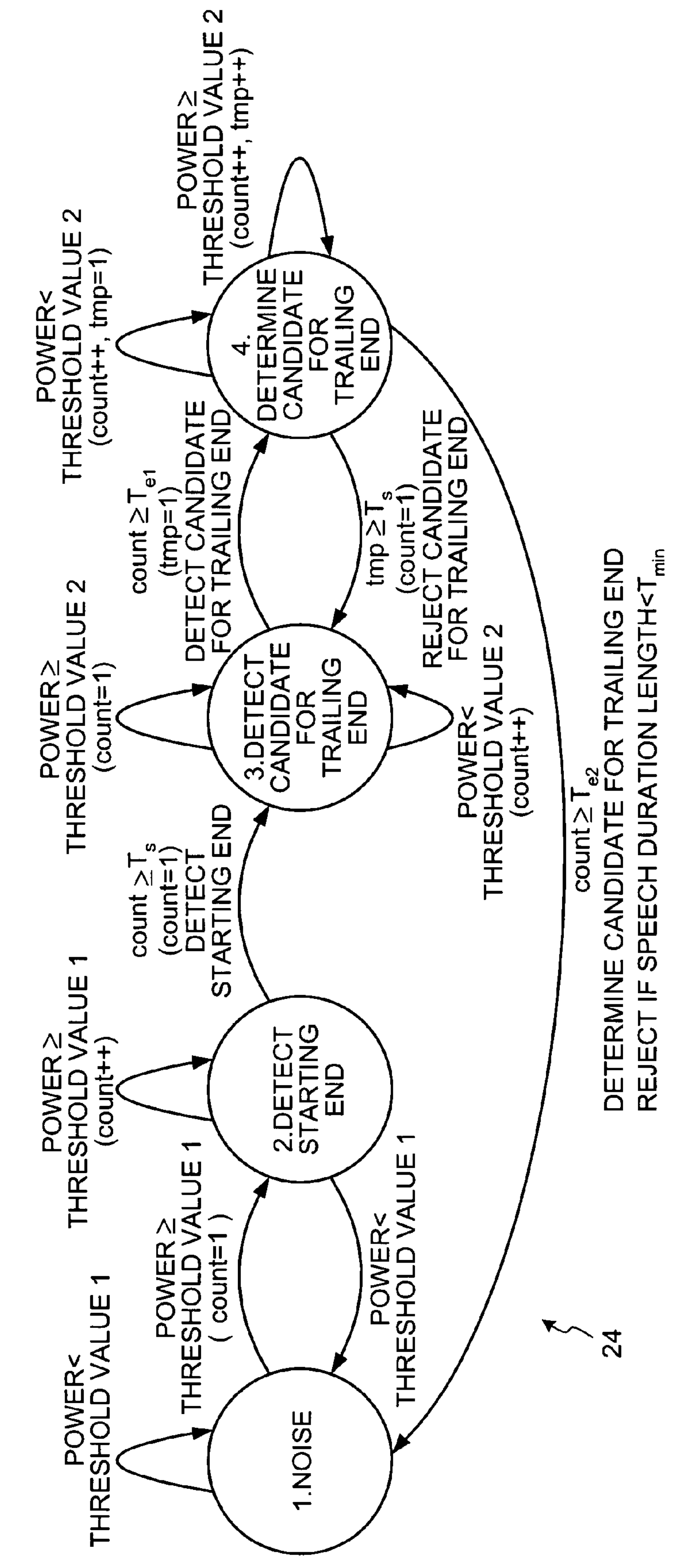
FIG. 3 is a state transition diagram of a configuration of a finite state automaton.

The FSA unit 24 will now be explained in detail. As shown in FIG. 3, a finite state automaton (FSA) of the FSA unit 24 has four states, i.e., a noise state, a starting end detection state, a trailing-end-candidate detection state, and a trailing-end-candidate determination state. The FSA of the FSA unit 24 uses a starting end detection time Ts as a first time length, a trailing-end-candidate detection time Te1 as a second time length, and a trailing end determination time Te2 as a third time length for detection of starting and trailing ends of speech. Such an FSA in the FSA unit 24 realizes a transition between the states based on comparison between an observed power and a preset threshold value.

In the FSA shown in FIG. 3, the noise state is determined as an initial state. When a power extracted from an input signal exceeds a threshold value 1 as a threshold value for starting end detection, a transition from the noise state to the starting end detection state is achieved. In the starting end detection state, when a duration where a power is equal to or above the threshold value 1 continues for the starting end detection time $T_s$, a starting end of the duration is determined as a starting end of speech, and the starting end detection state shifts to the trailing-end-candidate detection state. Here, the starting end detection time-$T_s$ is set to approximately 100 milliseconds to avoid an erroneous operation due to extemporaneous noise other than speech. At this time, a position obtained by adding a preset offset may be determined as a final starting end position of speech. That is, when a starting end position detected by the automaton is a position that is T second behind a processing start position, a position obtained by adding a starting end offset $F_s$, i.e., a position that is $T+F_s$ seconds behind may be determined as a final starting end position. When the starting end offset $F_s$ is negative, a position harked back to the past is determined as a final starting end of speech. When the starting end offset $F_s$ is positive, a position advanced to the future is determined as the same. When speech-duration detection is used as preprocessing of speech recognition, missing an anlaut of speech at a speech-duration detection stage does not lead to restoration of information, thereby deteriorating speech recognition performance. Thus, in detection of a starting end, giving a negative offset value enables extensive detection of a starting end of speech in a direction of the past. As a result, missing a starting end of speech can be avoided, thereby improving a speech recognition accuracy. In the starting end detection state, when the power is lower than the threshold value 1, the state shifts to the noise state as the initial state. This is a series of processing of detecting a starting end of speech.

Detection of a trailing end of speech will now be explained. In the trailing-end-candidate detection state, a threshold value 2 as a threshold value required to detect a trailing end is used to achieve a transition between the states of the FSA. In general, a magnitude of human voice is reduced toward a last half of utterance. Therefore, when a characteristic is a power, like the embodiment, a setting, e.g., the threshold value 1>the threshold value 2 enables threshold value setting that is optimum for detection of a starting end and a trailing end. As another threshold value setting method, the threshold value may be adaptively varied for each frame rather than setting a fixed value in advance. In the trailing-end-candidate detection state, when a duration where the power is lower than the threshold value 2 continues for the trailing-end-candidate detection time $T_{e1}$ or more, a starting end of the duration is determined as a trailing-end-candidate point, and the trailing-end-candidate detection state shifts to the trailing-end-candidate determination state. In this case, transmitting trailing end information to the voice recognizer 25 at a rear stage upon detection of the candidate point can improve responsiveness of the entire system.

In the trailing-end-candidate determination state, after transition between the states, when a duration where the power is equal to or above the threshold value 2 does not continue for the starting end detection time $T_s$ while the trailing end determination time $T_{e2}$ elapses from measurement at the trailing-end-candidate point, the trailing-end-candidate point is determined as a trailing end of speech. In other cases, i.e., when the duration where the power is equal to or above the threshold value 2 continues for the starting end detection time $T_s$, the trailing-end-candidate point detected in the trailing-end-candidate detection state is canceled, and the current state shifts to the trailing-end-candidate detection state. When a finally detected speech-duration length (a trailing end time instant—a starting end time instant) is shorter than a preset minimum speech-duration length $T_{min}$, the detected duration is possibly extemporaneous noise, and the detected starting end and trailing end positions are thereby canceled to achieve a transition to the noise state. As a result, an accuracy can be improved. As a rough standard of a minimum unit for utterance, the minimum speech-duration length $T_{min}$ is set to approximately 200 milliseconds.

As explained above, according to the embodiment, two time continuation length parameters, i.e., the candidate point detection time and the candidate point determination time are used for detection of a trailing end of speech. Here, in the trailing-end-candidate detection state, detection including a soundless duration in a word, e.g., a double consonant is intended. In the trailing-end-candidate determination state, whether a candidate point detected in the trailing-end-candidate detection state corresponds to silence in a word, e.g., a double consonant or silence after end of utterance is judged.

It is to be noted that the trailing-end-candidate detection time $T_{e1}$ is set to approximately 120 milliseconds with a length that is equal to or longer than a soundless duration (double consonant) included in a word being determined as a rough standard, and the trailing end determination time $T_{e2}$ is set to approximately 400 milliseconds as a length representing an interval between utterances.

In detection of a trailing end, like detection of a starting end, a position obtained by adding a trailing end offset Fe can be determined as a final speech trailing end position. When speech-duration detection is used as preprocessing of speech recognition, a positive offset value is usually provided in trailing end detection. As a result, missing an end of an uttered word can be avoided, thereby improving a speech recognition accuracy.

Figure 4:
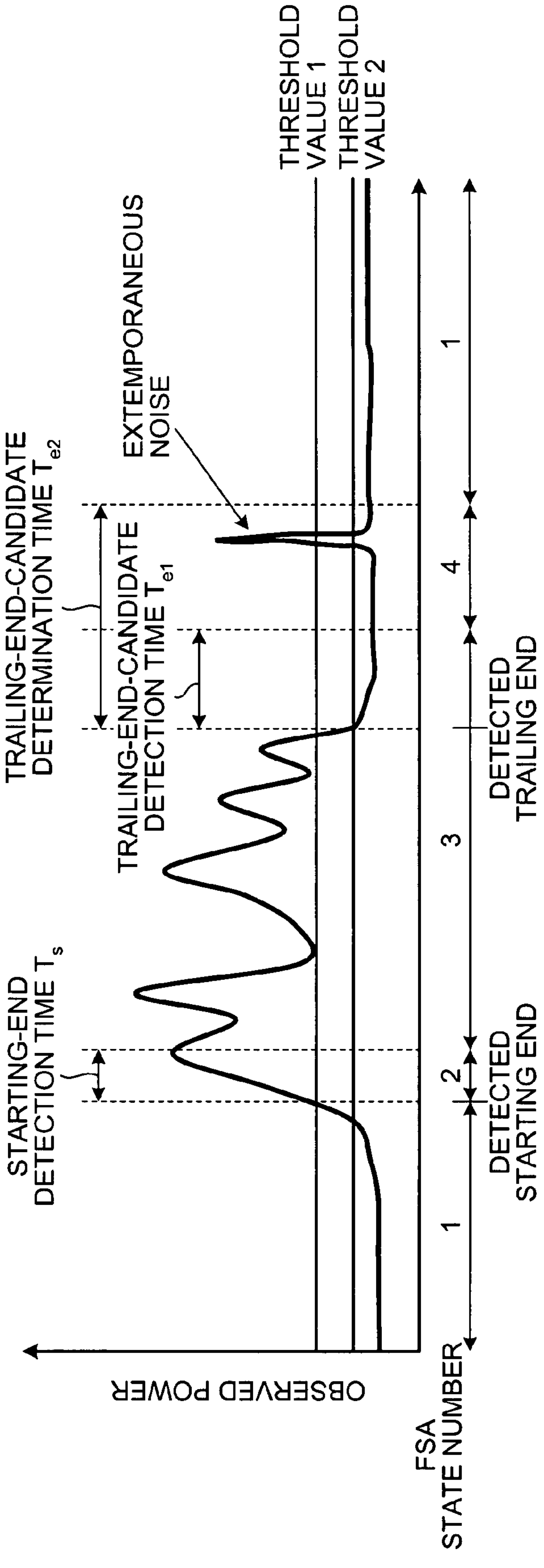
FIG. 4 is a graph of an example of an observed power envelope and state transition of the finite state automaton.

As explained above, according to the embodiment, two time continuation length parameters, i.e., the candidate point detection time and the candidate point determination time are used for detection of a trailing end of speech to provide two states, i.e., the candidate point detection state and the candidate point determination state for a trailing end of speech. Consequently, even if noise extemporaneously occurs after an appropriate trailing end (a correct trailing end) of a speech-duration as shown in FIG. 4, a state transition shown in FIG. 4 enables detection of the correct speech trailing end. That is, according to the embodiment, silence in a word can be discriminated from silence after end of utterance.

Realizing high-performance speech-duration detection in this manner can improve speech recognition performance when the detection is used as, e.g., preprocessing of speech recognition. When a correct trailing end is detected, an unnecessary frame that can be a target of speech recognition processing can be eliminated. Therefore, not only a response speed with respect to speech can be increased but also an amount of calculation can be reduced.

It is to be noted that a short-time power is used as a characteristic for each frame in the embodiment, but the present invention is not restricted thereto. Any other characteristic can be used. For example, in Patent Document 1, a likelihood ratio of a voice model and a non-voice model is, used as a characteristic per predetermined time.

A second embodiment according to the present invention will now be explained with reference to FIGS. 5 to 7. It is to be noted that same reference numerals denote parts equal to those in the first embodiment, thereby omitting an explanation thereof.

According to the embodiment, in detection of a starting end of speech, two states of, e.g., candidate point detection and candidate point determination are provided.

Figure 5:
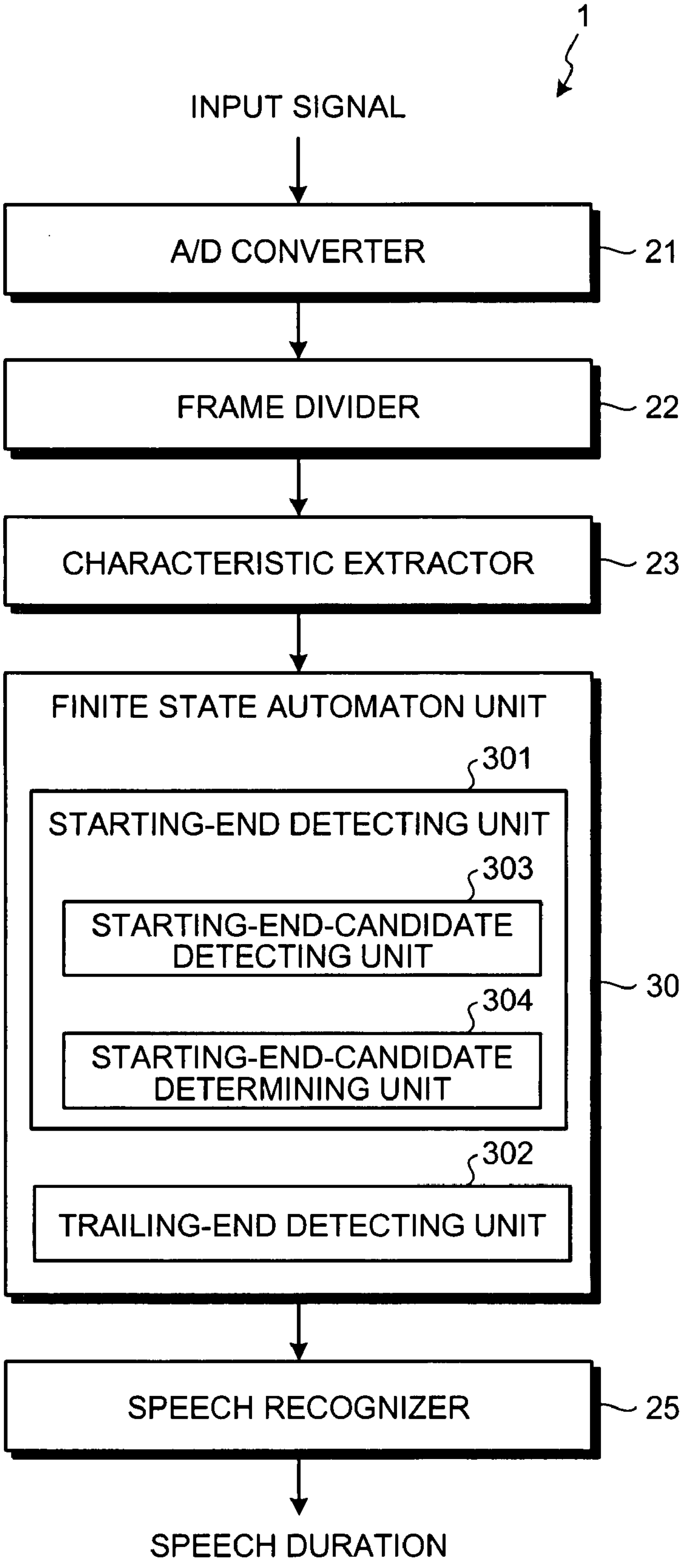
FIG. 5 is a block diagram of a functional configuration of a speech-duration detector according to a second embodiment of the present invention.

FIG. 5 is a block diagram of a functional configuration of a speech-duration detector 1 according to the second embodiment. As shown in FIG. 5, the speech-duration detector 1 according to the embodiment includes an A/D converter 21 that converts an input signal into a digital signal from an analog signal at a predetermined sampling frequency in compliance with a speech-duration detection program, a frame divider 22 that divides a digital signal output from the A/D converter 21 into frames, a characteristic extractor 23 that calculates a power from frames divided by the frame divider 22, a finite state automaton (FSA) unit 30 that uses a power obtained by the characteristic extractor 23 to detect starting and trailing ends of speech, and a voice recognizer 25 that uses duration information from the FSA unit 30 to perform speech recognition processing.

The FSA unit 30 includes a starting-end detecting unit 301 that detects a starting end of a duration where a characteristic extracted by the characteristic extractor 23 exceeds a threshold value as a starting end of a speech-duration when the duration continues for a predetermined time, and a trailing-end detecting unit 302 that detects a starting end of a duration where a characteristic extracted by the characteristic extractor 23 is lower than the threshold value as a trailing end of a speech-duration when the duration continues for a predetermined time. The starting-end detecting unit 301 includes a starting-end-candidate detecting unit 303 that detects a candidate point for a starting point of speech, and a starting-end-candidate determining unit 304 that determines a starting-end-candidate point detected by the starting-end-candidate detecting unit 303 as a starting end of speech.

A procedure of processing will now be explained hereinafter. First, the A/D converter 21 converts an input signal that is used to detect a speech-duration from an analog signal to a digital signal. Then, the frame divider 22 divides the digital signal converted by the A/D converter 21 into frames each having a length of 20 to 30 milliseconds and an interval of approximately 10 to 20 milliseconds. At this time, a hamming window may be used as a windowing function that is required to perform framing processing. Subsequently, the characteristic extractor 23 extracts a power from an acoustic signal of each frame divided by the frame divider 22. Thereafter, the FSA unit 30 uses the power of each frame extracted by the characteristic extractor 23 to detect a starting and a trailing ends of speech, and performs speech recognition processing with respect to the detected duration.

The FSA unit 30 will now be explained in detail. As shown in FIG. 6, a finite state automaton (FSA) of the FSA unit 30 has four states, i.e., a noise state, a starting-end-candidate detection state, a starting-end-candidate determination state, and a trailing end detection state. The finite state automaton (FSA) of the FSA unit 30 uses a starting-end-candidate detection time $T_{s1}$ as a fourth time length, a starting end determination time $T_{s2}$ as a fifth time length, and a trailing end detection time $T_e$ as a sixth time length in detection of a starting and a trailing ends of speech. In such an FSA of the FSA unit 30, a transition between the states can be achieved based on comparison between an observed power and a preset threshold value.

Figure 6:
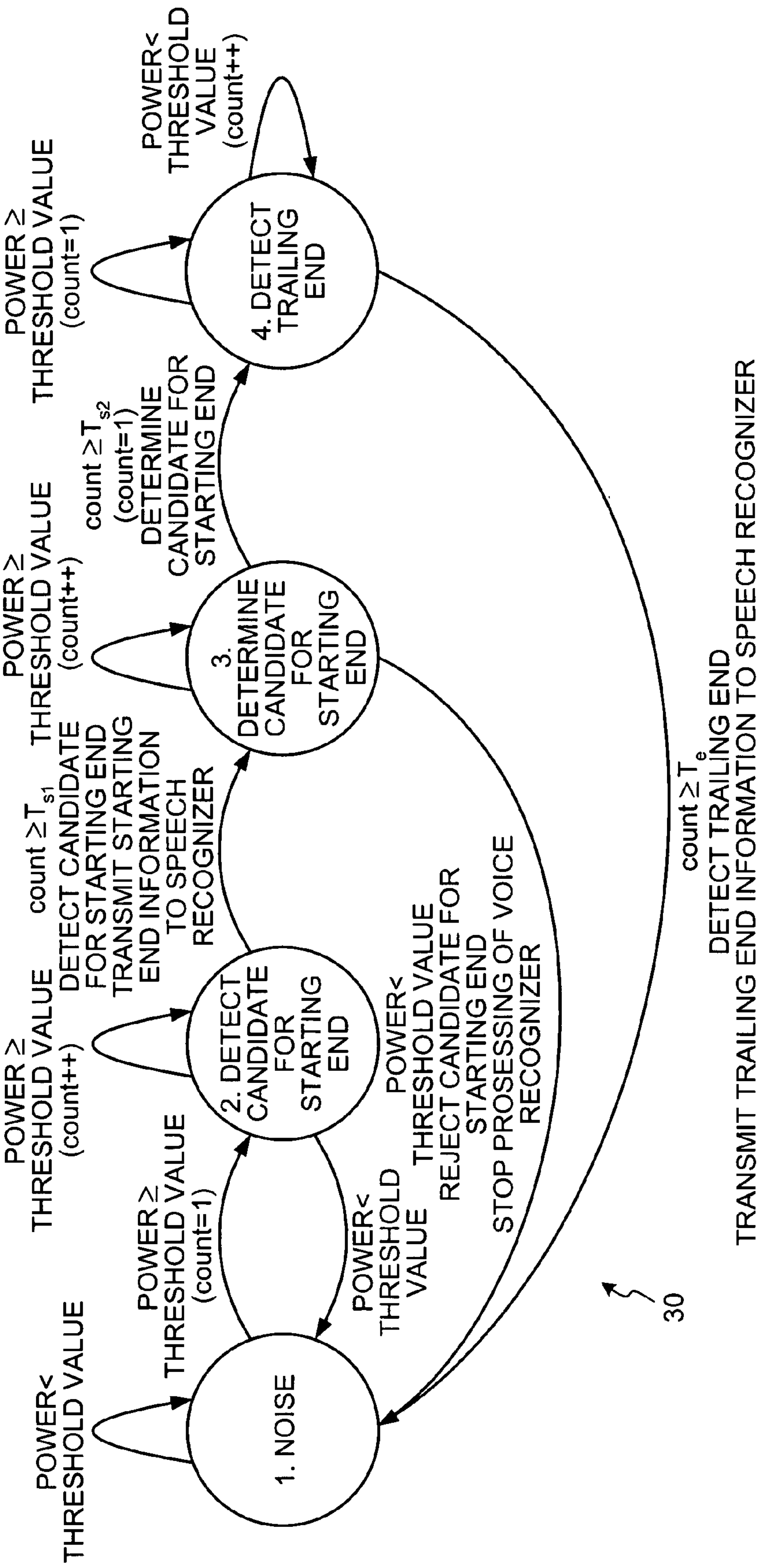
FIG. 6 is a state transition diagram of a configuration of a finite state automaton.
Figure 7:
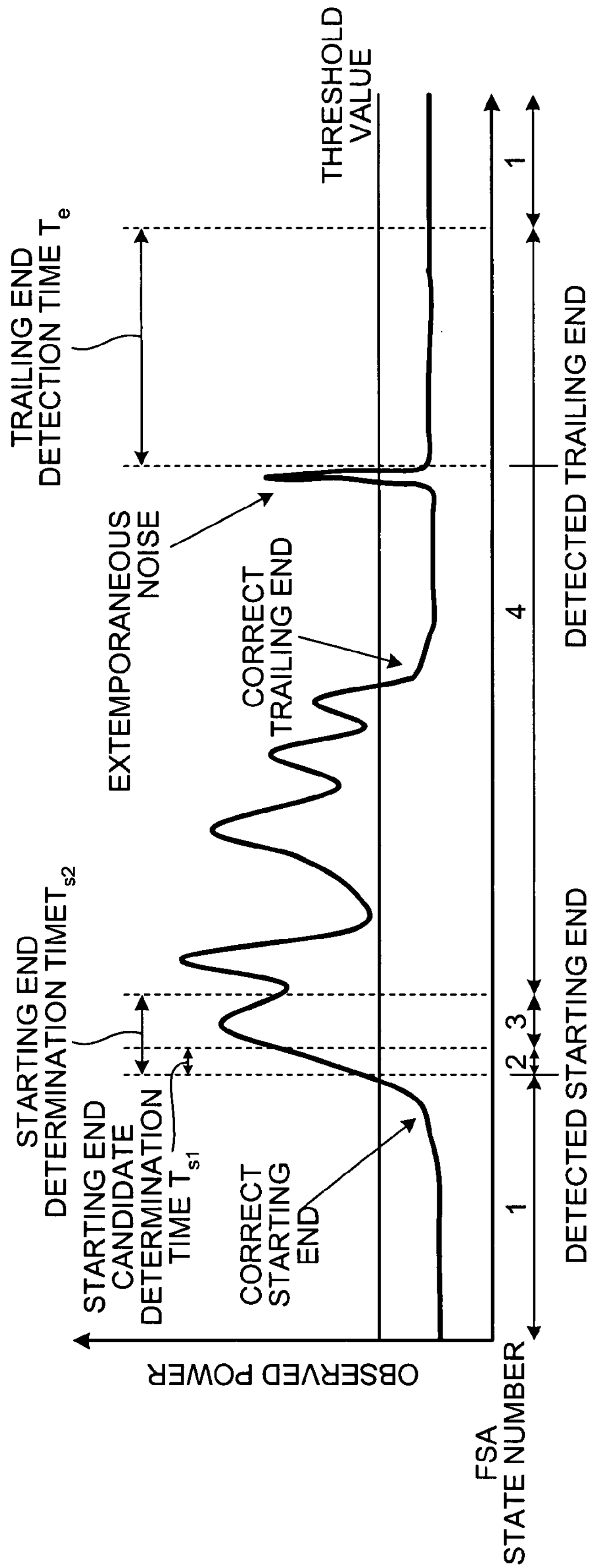
FIG. 7 is a graph of an example of an observed power envelope and state transition of the finite state automaton.

In the FSA shown in FIG. 6, the noise state is an initial state, and a transition to the starting-end-candidate detection state is achieved when a power extracted from an input signal exceeds a threshold value for detection of a starting and a trailing ends. Here, not only the threshold value for the power is set as a fixed value in advance, but also the threshold value may be adaptively varied for each frame.

In the starting-end-candidate detection state, when a duration where the power is equal to or above the threshold value continues for the starting-end-candidate detection time $T_{s1}$, a starting end of the duration is detected as a starting-end-candidate point of speech, and the current state shifts to the starting-end-candidate determination state. On the other hand, in the starting-end-candidate detection state, when the power is lower than the threshold value, the current state shifts to the noise state as the initial state. At this time, information of the detected starting-end-candidate point is transmitted to the voice recognizer 25 on a rear stage to start speech recognition processing from a frame where the starting-end-candidate point is detected.

In the starting-end-candidate determination state, when counting starts from the starting-end-candidate point and a duration where the power exceeds the threshold value, continues for the starting-end-candidate determination time $T_{s2}$, the starting-end-candidate point is determined as a starting end of speech, and the current state shifts to the trailing end detection state. On the other hand, in the starting-end-candidate determinations state, when the power is lower than the threshold value, the detected starting-end-candidate point is canceled, speech recognition processing on the rear stage is stopped, and initialization is carried out, thereby achieving a transition to the starting-end-candidate detection state. Here, the starting-end-candidate detection time $T_{s1}$ is set to approximately 20 milliseconds, and the starting-end-candidate determination time $T_{s2}$ is set to approximately 100 milliseconds.

As explained above, a configuration of detecting and determining a candidate point is adopted for detection of a starting end, and speech recognition processing on the rear stage is started when the candidate point is detected. As a result, as shown in FIG. 7, a response time of $(T_{s2}-T_{s1})$ milliseconds can be gained as compared with a conventional technology. In general, speech-duration detection is often used as preprocessing of, e.g., speech recognition. If detected speech-duration information can be rapidly transmitted to the voice recognizer 25 on the rear stage, responsiveness of entire speech recognition can be improved. It is to be noted that, when the starting end detection time $T_s$ is simply reduced in the conventional technology, erroneous detection of a starting end is increased due to an influence of, e.g., extemporaneous noise.

On the other hand, in the trailing end detection state, when a duration where the power is lower than the threshold value continues for the trailing end detection time $T_e$, a starting end of the duration is detected as a trailing end of speech, and information about the detection is transmitted to the voice recognizer 25 on the rear stage. The voice recognizer 25 performs characteristic amount extraction and decoder processing for speech recognition with respect to a frame from the starting end to the trailing end detected by the FSA unit 30.

When a finally detected speech-duration length (a trailing end time instance—a staring end time instance) is shorter than a preset minimum speech-duration length $T_{min}$, the detected duration possibly corresponds to extemporaneous noise, and the detected starting and trailing end positions are thereby canceled to achieve a transition to the noise state. Consequently, an accuracy can be improved. As a rough standard of a minimum unit for utterance, the minimum speech-duration length $T_{min}$ is set to approximately 200 milliseconds.

It is to be noted that a candidate point alone is detected in regard to a starting point in the embodiment, but a candidate point can be likewise detected with respect to a trailing end by using such a technique as explained in conjunction with the first embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A speech-duration detector comprising:

a characteristic extracting unit that extracts a characteristic of an input acoustic signal;

a starting-end detecting unit that detects a starting end of a first duration where the characteristic is equal to or greater than a threshold value as a starting end of a speech-duration, when the first duration continues for a first time length;

a trailing-end-candidate detecting unit that detects a starting end of a second duration where the characteristic is lower than the threshold value as a candidate point for a trailing end of speech, when the second duration continues for a second time length; and a trailing-end-candidate determining unit that (i) determines the candidate point as a trailing end of the speech-duration, when a third duration where the characteristic is equal to or greater than the threshold value does not continue for a preset time length while a third time length elapses from measurement at the candidate point, and (ii) cancels the candidate point as a trailing end of the speech-duration, when the third duration where the characteristic is equal to or greater than the threshold value continues for more than the preset time length while the third time length elapses from measurement at the candidate point.

2. The speech-duration detector according to claim 1, wherein the second time length and the third time length are different from each other.

3. The speech-duration detector according to claim 1, wherein the trailing-end-candidate determining unit determines a position obtained by adding an offset to the determined trailing end of the speech-duration as a final trailing end of the speech-duration.

4. The speech-duration detector according to claim 1, wherein a position of the detected starting end and a position of the detected trailing end of the speech-duration are rejected, when a time length of the speech-duration from the detected starting end to the detected trailing end is smaller than a preset minimum speech-duration length.

5. A speech-duration detector comprising:

a characteristic extracting unit that extracts a characteristic of an input acoustic signal;

a starting-end-candidate detecting unit that (i) detects a starting end of a first duration where the characteristic is equal to or greater than a threshold value as a candidate point for a starting point of speech, when the first duration continues for a first time length;

a starting-end-candidate determining unit that (i) determines the candidate point as a starting end of a speech-duration, when measurement starts from the candidate point and a second duration where the characteristic is equal to or greater than the threshold value continues for a second time length, and (ii) cancels the candidate point as a starting end of speech-duration, when the second duration does not continue for the second time length; and a trailing-end detecting unit that detects a starting end of a third duration where the characteristic is lower than the threshold value as a trailing end of the speech-duration, when the third duration continues for a third time length.

6. The speech-duration detector according to claim 5, wherein the first time length and the second time length are different from each other.

7. The speech-duration detector according to claim 5, wherein the starting-end-candidate determining unit determines a position obtained by adding an offset to the determined starting end of the speech-duration as a final starting end of the speech-duration.

8. The speech-duration detector according to claim 5, wherein a position of the detected starting end and a position of the detected trailing end of the speech-duration are rejected, when a time length of the speech-duration from the detected starting end to the detected trailing end is shorter than a preset minimum speech-duration length.

9. A computer program product comprising a non-transitory computer readable medium including program instructions for detecting speech-duration, wherein the instructions, when executed by a computer, cause the computer to perform steps comprising:

extracting a characteristic of an input acoustic signal;

detecting a starting end of a first duration where the characteristic is equal to or greater than a threshold value as a starting end of a speech-duration, when the first duration continues for a first time length;

detecting a starting end of a second duration where the characteristic is lower than the threshold value as a candidate point, when the second duration continues for a second time length;

determining the candidate point as a trailing end of the speech-duration, when a third duration where the characteristic is equal to or greater than the threshold value does not continue for a preset time length while a third time length elapses from measurement at the candidate point; and canceling the candidate point as a trailing end of the speech-duration, when the third duration where the characteristic is equal to or greater than the threshold value continues for more than the preset time length while the third time length elapses from measurement at the candidate point.

10. A computer program product comprising a non-transitory computer readable medium including program instructions for detecting speech-duration, wherein the instructions, when executed by a computer, cause the computer to perform steps comprising:

extracting a characteristic of an input acoustic signal;

detecting a starting end of a first duration where the characteristic is equal to or greater than a threshold value as a candidate point, when the first duration continues for a first time length;

determining the candidate point as a starting end of a speech-duration, when measurement starts from the candidate point for the starting end of speech and a second duration where the characteristic is equal to or greater than the threshold value continues for a second time length;

canceling the candidate point as a starting end of a speech-duration, when the second duration does not continue for the second time length; and detecting a starting end of a third duration where the characteristic is lower than the threshold value as a trailing end of the speech-duration, when the third duration continues for a third time length.

11. A speech-duration detector comprising:

a characteristic extracting unit that extracts a characteristic of an input acoustic signal;

a starting-end detecting unit that detects a starting end of a first duration where the characteristic is equal to or greater than a first threshold value as a starting end for a speech-duration, when the first duration continues for a first time length;

a trailing-end-candidate detecting unit that detects a starting end of a second duration where the characteristic is lower than a second threshold value as a candidate point for a trailing end of speech, when the second duration continues for a second time length;

a trailing-end-candidate determining unit that (i) determines the candidate point as a trailing end of the speech-duration, when a third duration where the characteristic is equal to or greater than the second threshold value does not continue for a preset time length while a third time length elapses from measurement at the candidate point, and (ii) cancels the candidate point as a trailing end of the speech-duration, when the third duration where the characteristic is equal to or greater than the second threshold value continues for more than the preset time length while the third time length elapses from measurement at the candidate point.

12. The speech-duration detector according to claim 11, wherein the second threshold is smaller than the first threshold.

13. A speech-duration detector comprising:

a characteristic extracting unit that extracts a characteristic of an input acoustic signal;

a starting-end candidate detecting unit that (i) detects a starting end of a first duration where the characteristic is equal to greater than a first threshold value as a candidate point for a starting point of speech, when the first duration continues for a first time length;

a starting-end-candidate determining unit that (i) determines the candidate point as a starting end of a speech-duration, when measurement starts from the candidate point and a second duration where the characteristic is equal to or greater than the first threshold value continues for a second time length, and (ii) cancels the candidate point as a starting end of speech-duration, when the second duration does not continue for the second time length; and a trailing-end detecting unit that detects a starting end of a third duration where the characteristic is lower than a second threshold value as a trailing end of the speech-duration, when the third duration continues for a third time length.

14. A computer program product comprising a non-transitory computer readable medium including program instructions for detecting speech-duration, wherein the instructions, when executed by a computer, cause the computer to perform steps comprising:

extracting a characteristic of an input acoustic signal;

detecting a starting end of a first duration where the characteristic is equal to or greater than a first threshold value as a starting end of a speech-duration, when the first duration continues for a first time length;

detecting a starting end of a second duration where the characteristic is lower than a second threshold value as a candidate point, when the second duration continues for a second time length;

determining the candidate point as a trailing end of the speech-duration, when a third duration where the characteristic is equal to or greater than the second threshold value does not continue for a preset time length while a third time length elapses from measurement at the candidate point; and cancelling the candidate point as a trailing end of the speech-duration, when the third duration where the characteristic is equal to or greater than the second threshold value continues for more than the preset time length while the third time length elapses from measurement at the candidate point.

15. A computer program product comprising a non-transitory computer readable medium including program instructions for detecting speech-duration, wherein the instructions, when executed by a computer, cause the computer to perform steps comprising:

extracting a characteristic of an input acoustic signal;

detecting a starting end of a first duration where the characteristic is equal to or greater than a first threshold value as a candidate point, where the first duration continues for a first time length;

determining the candidate point as a starting end of a speech-duration, when measurement starts from the candidate point for the starting end of speech and a second duration where the characteristic is equal to or greater than the first threshold value continues for a second time length;

canceling the candidate point as a starting end of speech-duration, when the second duration does not continue for the second time length; and detecting a starting end of a third duration where the characteristic is lower than a second threshold value as a trailing end of the speech-duration, when the third duration continues for a third time length.

* * * * *